États-Unis Patent Office 3,062,594
Patented Nov. 6, 1962

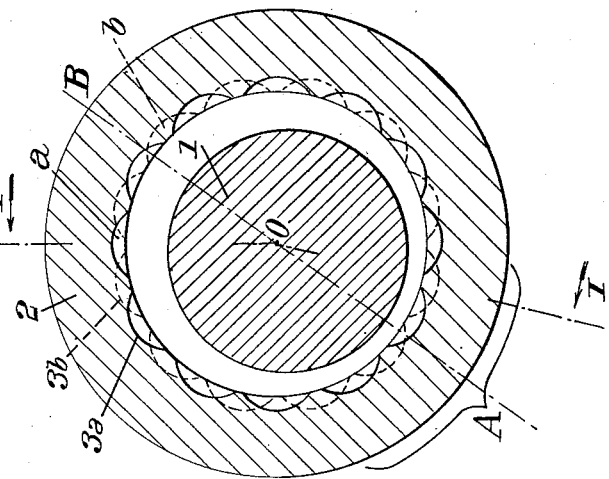
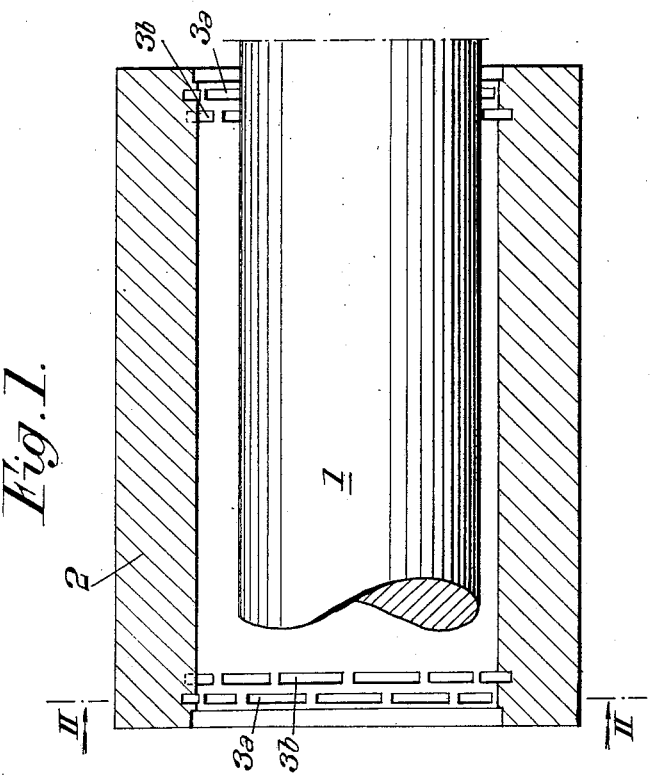

3,062,594
FLUID FILM DYNAMIC BEARING SYSTEMS
Fernand Bourquard, Courbevoie, France, assignor to Commissariat a l'Energie Atomique, Paris, France, a French organization
Filed June 30, 1960, Ser. No. 40,063
Claims priority, application France July 7, 1959
1 Claim. (Cl. 308—36.1)

The present invention relates to fluid film dynamic bearing systems, that is to say to systems comprising a rotating element, for instance a shaft the relative rotational movement of which is guided with a slight radial play by a bearing element which is generally fixed but which might possibly have also a movement of rotation different from that of the rotating element, said radial play permitting the formation of a fluid film on which the rotating element is supported with respect to the bearing element. The invention is more especially but not exclusively concerned with systems of this kind in which the fluid film is gaseous.

The object of this invention is to provide a system of the above mentioned kind which is better adapted to meet the requirements of practice, especially concerning its over-all dimensions in the axial direction.

In systems of the type above described, one of the elements, in particular the bearing element, is provided at each of its ends with at least one groove located in a plane transverse to the axial direction serving to oppose the escape of the fluid at said ends from the space between said elements. According to the present invention, each of said grooves is provided with radial partitions so as to form at least one continuous groove section located wholly within a circular arc corresponding to a portion of the interval between the elements where said film of fluid is under pressure.

Preferred embodiments of the present invention will be hereinafter described with reference to the accompanying drawings, given merely by way of example and in which:

FIG. 1 is a section on the line I—I FIG. 2 of a gaseous fluid film bearing system made according to the invention.

FIG. 2 is a cross sectional view on the line II—II of FIG. 1.

The bearing system includes a bearing element 2 having a smooth internal cylindrical wall of a diameter slightly greater than that of shaft 1 so that a slight play is provided between said shaft and said bearing element.

It is known that, with such an arrangement, shaft 1, when it rotates at sufficient speed, occupies a relatively stable position, with a small eccentricity with respect to bearing element 2, the gaseous fluid that is present between the two elements 1 and 2 being driven in rotation so as to form between said elements a gaseous film which supports the shaft at some distance from the inner wall of the bearing element. The pressure of this gaseous film is maximum in the vicinity of radial plane OA where the play is minimum, this pressure being on the contrary minimum in the vicinity of radial plane OB diametrally opposed to the preceding one and where the radial play is maximum.

In other words, in every cross section of the system, the pressure of the gaseous film varies along the circumference from a maximum value to a minimum value corresponding respectively to opposed planes OA and OB, the angular position of which depends, among other factors, upon the direction of rotation of shaft 1.

It follows that a gas circulation tends to take place in the space between the external atmosphere and the space existing between shaft 1 and bearing 2, gas penetrating into said space along the circumferential portions where the gaseous film pressure is lowest and an outflow of gas taking place from this space in the circumferential portions where the pressure of said film is highest.

Whatever be the place where gas enters the space between shaft 1 and bearing 2 (for instance, at the ends of said bearing in the case illustrated by FIGS. 1 and 2), the outflow of gas always takes place, at the ends of the system, through a sector which will be hereinafter called "leak sector" corresponding to the zone of high pressure of the gaseous film.

Consequently, the pressure in the space between shaft and bearing, at the ends of the bearing element, tends to become equal to the pressure of the atmosphere so that the end portions of the bearing element have a supporting action smaller than the central portion of said element.

In order to take this fact into account, it is necessary to make the bearing element of a length much greater than that which would be sufficient if the leaks above referred to did not exist or at least were greatly reduced.

It is therefore necessary to reduce said leaks since this permits of reducing the length of the bearing system.

For this purpose, it has already been proposed to provide at the ends of the bearing circular grooves formed in the internal wall of the bearing element at both ends thereof.

Unfortunately, this arrangement, which gives satisfactory results in the case of oil bearings, becomes practically inoperative in the case of a gaseous fluid film bearing system. This is due to the fact that, in this case, there is produced in every circular groove, due to the pressure difference existing between the different sectors of the gaseous film, a circumferential circulation which tends to make the pressure in said groove uniform over its whole length.

This circumferential circulation is in fact equivalent to a leak of the gaseous film near the ends of the bearing so that the above mentioned drawback remains.

The object of this invention is to eliminate this drawback.

The invention is characterized by the following feature.

The bearing element is provided near the ends thereof with grooves, preferably two or more grooves, such as 3a, 3b, located side by side and said grooves are partitioned radially so as to form at least one continuous groove section located wholly within a circular arc corresponding to a portion of the interval between shaft 1 and bearing 2 where the fluid film is under pressure.

Thus, the grooves are limited to circular arcs corresponding only to the portions under pressure of the space between shaft 1 and bearing 2 and the mean pressure in said groove portions will be substantially higher than that which would exist if an uninterrupted circular groove of the conventional type were used. Consequently, the maximum pressure of the film at the ends of the systems will be increased, thus ensuring a better support of the shaft and making it unnecessary to increase the length of the bearing element for a given load of shaft 1. Each groove 3a, 3b may, according to the invention above described, be limited to a single circular arc the position of which in the bearing element corresponds to the leak sector of the bearing end that is considered. But it seems preferable to have grooves extending over a longer circular arc and, even, preferably, over 360°, while providing a multiplicity of radial partitions which divide each of the grooves into a multiplicity of independent groove portions each of them extending over an arc at most equal to that of the leak sector. In this way, the angular position of the bearing element 2 and the direction of rotation of shaft 1 have no influence upon the efficiency of the grooves since, whatever be angular position of planes OA, OB, that is to say whatever be the angular position of the leak sector there are always groove portions in said leak sector which do not communicate with the groove portions located in the low pressure portions of the interval between shaft 1 and bearing 2.

On FIG. 2, a bracket indicates the group of groove portions which are effective for this purpose for the eccentric position of shaft 1 indicated by said figure.

Concerning now the radial partitions formed in successive grooves such as 3a and 3b, the respective partitions of said grooves may be located in line with each other, but preferably, as shown by FIG. 2, the groove portions limited by said partitions are mounted in staggered relationship.

It should be noted that the number of "stages" of each set of grooves, that is to say the number of groove portions through which the gas under pressure must flow in order to escape from the space between shaft 1 and bearing 2, may be made variable from one sector to another, the leak sector comprising the maximum number of stages.

To constitute the radial partitions in grooves 3a and 3b, it is advantageous to make use of the arrangement shown by FIG. 2 where every groove portion is constituted by a circular recess, the whole of these recesses (twelve in the embodiment shown by the drawing) forming a groove. Of course, the recesses forming each groove must not overlap one another, so as to leave between them the desired partition. The recesses of groove 3a have been designated by reference character "a" and those forming groove 3b by "b."

Finally, it should be pointed out that the groove portion above referred to, instead of being formed directly in the body of the bearing, might be formed in pieces fixed in said body at suitable places.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claim.

What I claim is:

In a fluid film dynamic bearing system, the combination of two elements, an inner one having its outer wall in the form of a body of revolution about an axis, said inner element being of elongated shape in the direction of this axis, and an outer one surrounding the other and having its inner wall in the form of a body of revolution about an axis parallel to the first axis, said outer element being of elongated shape in the direction of said axes, one of these elements being a bearing element and at least the other one being a rotating element, the diametral dimension of the inner element being in any cross section thereof just a little smaller than the diametral dimension of the outer element in the same cross section, a film of gaseous fluid separating said elements from each other, each end of said bearing element being provided in the wall thereof facing the other element, with at least one groove located in a plane transverse to said axes, to oppose the escape of said gaseous fluid at said ends from between said elements, said groove being provided with radial partitions so as to form at least one continuous groove section located wholly within a circular arc corresponding to a portion of the interval between said elements where said film of gaseous fluid is under pressure, the wall of said bearing element being smooth over the whole length thereof extending between grooves and the wall of the other element being smooth over the whole length thereof where it faces the wall of the bearing element.

References Cited in the file of this patent

UNITED STATES PATENTS

| | | |
|---|---|---|
| 1,218,808 | Sheehy | Mar. 13, 1917 |
| 1,882,956 | Sandler | Oct. 18, 1932 |
| 1,980,081 | Ovington | Nov. 6, 1934 |
| 2,963,268 | Smile et al. | Dec. 6, 1960 |

FOREIGN PATENTS

| | | |
|---|---|---|
| 728,474 | France | Apr. 12, 1932 |